United States Patent Office 2,996,539
Patented Aug. 15, 1961

2,996,539
PRODUCTION OF TRIALKYLBOROXINES AND ALKYLDIHYDROXYBORANES
Albert D. McElroy, Mars, and Richard M. Hunt, Butler, Pa., assignors to Callery Chemical Company, Pittsburgh, Pa., a corporation of Pennsylvania
No Drawing. Filed Nov. 17, 1959, Ser. No. 853,440
12 Claims. (Cl. 260—500)

This invention relates to the preparation of organoboranes and more particularly to the preparation of trialkylboroxines, $B_3O_3R_3$, and alkyldihydroxyboranes, $RB(OH)_2$.

Organoboranes are compounds in which a boron atom is directly linked to one or more carbon atoms of an organic radical. Such compounds have been known in the art but they have always been relatively scarce and expensive because of the difficulties encountered and the expensive reactants needed in their preparation. They have been, therefore, generally considered unsuitable for commercial production, and such compounds have found little use in volume processes. Recently, however, interest in organoboranes such as trialkylboroxines, alkydihydroxyboranes, and related compounds has been stimulated because of the discovery of several potentially large-scale uses for such compounds. For example, these organobranes have been found to be useful as fuel additives in internal combustion engines, as plasticizers, as treating agents and for other applications in which large quantities and a low price are desirable. Thus new methods for the production of these compounds which would be applicable to large-scale use have been sought.

The recent discovery of the method described in the application of Iloff, Serial No. 790,360, filed February 2, 1959 (of common ownership with this application) has provided a substantial advance in the art of producing trialkylboroxines and triarylboroxines as well as dihydroxyorganoboranes. This method comprises the reaction of a trialkyl or triarylboroxine with a triorganoborane, preferably at temperatures between about 230° and 350° C. While this process has been found to be more suitable for large-scale production than other known methods, it has suffered from the disadvantages of requiring relatively high temperatures as well as long reaction times.

We have now discovered that the foregoing disadvantages of the above described method for producing trialkylboroxines and alkyldihydroxyboranes can be overcome by the substitution of an alkyldiborane or a mixture of alkyldiboranes as the reactant instead of a triorganoborane. This substitution can be used whenever a trialkylboroxine or alkyldihydroxyborane is desired as the product and permits the use of lower temperatures and substantially shorter reaction times. For example, the preferred temperatures for operation in our process are as low as 170° C. and in no case have we found it particularly desirable to use temperatures above about 225° C. Our process is operable at temperatures as low as 70° C., and even at such low temperatures proceeds at a rate faster than that realized with the prior process at temperatures of about 100° C., and the elevated temperatures which are preferred for most efficient operation of our method are substantially lower than those which could be economically used heretofore. In addition, the reaction time is very greatly reduced by the use of our process. For example, the production of trialkylboroxines has heretofore required reaction times in excess of twelve hours to achieve substantially complete reaction, even at about 300° C. Using our process, trialkylboroxines are produced with comparable efficiencies at about 200° C. for two hours. In large scale operation, such an increase in reaction efficiency provides substantial economic benefits and provides large-scale cost reductions in the process.

As mentioned above, the minimum temperature at which the reaction of the alkyldiborane with the boroxine may be carried out so as to produce the trialkylboroxine is about 70° C. However, in order to increase the reaction rate it is preferred to use somewhat higher temperatures, generally between about 170° C. and about 225° C. Temperatures above 225° C. may also be used, although such high temperatures are not usually necessary or desirable, up to the decomposition temperature of the reactants and products.

The pressure which is used in carrying out the reaction is not critical, but the preferred temperatures of operation are quite often above the boiling point of one or more of the reactants used. For this reason a closed system should be used in order to prevent losses and the pressure which develops in such closed systems may be superatmospheric. Such pressures have not been found to affect the reaction in any undesirable manner.

The alkyldiboranes which are used as reactants in our process are compounds corresponding to the formula $R_xB_2H_{6-x}$ in which R is an alkyl group and $x$ is an integer from one to four. These compounds may be prepared by various methods, such as the method described by Schlesinger et al., J. Am. Chem. Soc. 57, 621 (1935), in which trialkylboranes are reacted with diborane. Examples of alkyldiboranes usable in our process, are mono-, di-, tri- and tetra-ethyldiboranes, propyldiboranes, butyldiboranes, hexyldiboranes, octyldiboranes, nonyldiboranes and dodecyldiboranes, as well as mixtures of these and other alkyldiboranes. A number of the alkyldiboranes, particularly the lower alkyl compounds, tend to disproportionate into other members of the alkyldiborane series having the same alkyl group but having different numbers of such groups attached to the boron atoms. Thus, for instance, the ethyldiboranes tend to form a mixture containing varying proportions of monoethyldiborane, diethyldiborane, triethyldiborane and tetraethyldiborane. Such mixtures of alkyldiboranes can be used in the process we have discovered and provide efficient and easy reaction.

The reaction of alkyldiboranes or a mixture of alkyldiboranes with a trialkoxyboroxine or a triaryloxyboroxine results in the production of a trialkylboroxine having alkyl groups corresponding to the alkyl groups present in the alkyldiborane used. Thus, the nature of the alkoxy or aryloxy substituent of the boroxine reactant is relatively unimportant insofar as the nature of the product is concerned. We have generally found it desirable to use trimethoxyboroxine as the boroxine reactant, because this boroxine is available commercially and is a colorless liquid at normal conditions of temperature and pressure which is easily handled in large quantities. However, other trialkylboroxines, or triaryloxyboroxines, as well as mixtures of boroxines, can be used. Examples of such other boroxines are triethoxyboroxine, triisopropoxyboroxine, triheptoxyboroxine, tridodecoxyboroxine, triphenoxyboroxine and tris(chloroisopropoxy)boroxine. In all these compounds the boron and oxygen atoms are alternated in a six membered ring with the aryloxy or alkoxy substituents attached to the boron atoms.

The product of the reaction as described herein is a trialkylboroxine of the general formula $B_3O_3R_3$ containing three B—C linkages. This product may be recovered and used as a discrete organoborane or it may be hydrolyzed to produce the corresponding alkyldihydroxyborane, $RB(OH)_2$. The hydrolysis takes place upon contact with water or a water-bearing reagent, and the alkyldihydroxyborane may be recovered and purified by conventional techniques such as filtration, extraction or recrystallization. No particular conditions of temperature and pressure are required for the hydrolysis of trialkylboroxines but quite often somewhat elevated temperatures are used in order to promote the rate of hydrolysis. When long-chain alkyl groups are present the rate of hydrolysis tends to be slower, but temperatures up to about 80° C. have been generally found to be sufficient, even when relatively complex alkyl groups are present on the boroxine.

Recovery of the trialkylboroxine from the reaction mixture has not always been found to be necessary or even desirable because the solution as obtained can easily be used to prepare the alkyldihydroxyboranes or other boron compounds. However, if the pure trialkylboroxine is to be obtained and used as, for example, a fuel additive, plasticizer, or catalyst, it may be recovered by conventional purification techniques such as stripping, distillation or extraction.

In one test demonstrating the method and practice of the process of this invention, diborane was reacted with 200 grams of octadecene at 15° C. to 90° C. Dioctadecyldiborane was produced and was mixed with 75 grams of trimethoxyboroxine, a 10% excess. The mixture was heated to 200° C. with stirring for two hours. The pressure reached 40 p.s.i.g. and was maintained at this level by a back pressure regulator and vent. Trioctadecylboroxine was produced and was hydrolyzed with water. The hydrolysis product was washed with water and pentane and vacuum dried. Chemical analysis, X-ray analysis, and infra-red spectrometric analysis, together with a molecular weight determination, showed that the product was almost pure dihydroxyoctadecylborane, $C_{18}H_{37}B(OH)_2$, along with a small amount of boric acid and traces of other alkyldihydroxyboranes. Three hundred fifty grams of dihydroxyoctadecylborane were obtained, a 92% yield based on the weight of octadecene used.

In another test, conducted similarly, a mixture of alkyldiboranes was prepared by the reaction of a commercial olefin comprising a mixture of n-hexadecene, n-octadecene and n-eicosene with diborane. The alkyldiborane mixture thus prepared averaged two alkyl groups for each diborane molecule and was a solid melting around 40° C. One hundred grams of this mixture was reacted with 46.5 grams of trimethoxyboroxine at 200° C. for two hours. A mixed alkyldihydroxyborane was obtained after the product of the reaction was hydrolyzed with water. The product had an average molecular weight of 271 indicating that the alkyl groups averaged 16 carbon atoms. One hundred eleven grams of this product were obtained.

As the above examples indicate, it is not necessary to use pure or individual olefins or alkyldiboranes as the starting materials, but mixtures of such compounds can be economically used and provide a use for the commercial products which are available.

Using the process of our invention and the general procedure used in the tests described above, other trialkylboroxines and alkyldihydroxyboranes are similarly produced. Some examples of the trialkylboroxines produced are triethylboroxine, tributylboroxine, triisopropylboroxine, trihexylboroxine, trioctylboroxine, trinonylboroxine and tridodecylboroxine; the alkyldihydroxyboranes obtained after hydrolysis are ethyldihydroxyborane, butyldihydroxyborane, dihydroxyisopropylborane, dihydroxyhexylborane, dihydroxyoctylborane, dihydroxynonylborane and dihydroxydodecylborane.

According to the provisions of the patent statutes, we have explained the principle and mode of practicing our invention, and have described what we now consider to be its best embodiments. However, we desire to have it understood that, within the scope of the appended claims, the invention may be practiced otherwise than as specifically described.

We claim:

1. A method of producing a trialkylboroxine which comprises reacting a boroxine selected from the group consisting of trialkoxyboroxines and triaryloxyboroxines with a member selected from the group consisting of alkyldiboranes of the formula $R_xB_2H_{6-x}$, where R is an alkyl group and $x$ is an integer from 1 to 4, and mixtures thereof, at a temperature of at least about 70° C.

2. A method in accordance with claim 1 in which the temperature is between about 170° C. and 225° C.

3. A method of producing a trialkylboroxine which comprises contacting a trialkoxyboroxine with at least one alkyldiborane at a temperature of at least about 70° C.

4. A method in accordance with claim 3 in which the temperature is between about 170° C. and 225° C.

5. A method in accordance with claim 3 in which the trialkoxyboroxine is trimethoxyboroxine.

6. A method of producing an alkyldihydroxyborane which comprises reacting a boroxine selected from the group consisting of trialkoxyboroxines and triaryloxyboroxines with a member selected from the group consisting of alkyldiboranes of the formula $R_xB_2H_{6-x}$, where R is an alkyl group and $x$ is an integer from 1 to 4, and mixtures thereof, at a temperature of at least about 70° C., subjecting the resulting mixture to hydrolysis and recovering the alkyldihydroxyborane thus formed.

7. A method in accordance with claim 6 in which the temperature is between about 170° C. and 225° C.

8. A method in accordance with claim 6 in which said boroxine is trimethoxyboroxine.

9. A method in accordance with claim 8 in which said member is a mixture of alkyldiboranes produced by the reaction of a mixture of n-hexadecene, n-octadecene and n-eicosene with diborane.

10. A method in accordance with claim 8 in which R is octadecyl.

11. A method in accordance with claim 8 in which R is nonyl.

12. A method in accordance with claim 8 in which R is dodecyl.

No references cited.